(12) United States Patent
Kim et al.

(10) Patent No.: US 11,281,890 B2
(45) Date of Patent: Mar. 22, 2022

(54) METHOD, SYSTEM, AND COMPUTER-READABLE MEDIA FOR IMAGE CORRECTION VIA FACIAL RATIO

(71) Applicant: Snow Corporation, Seongnam-si (KR)

(72) Inventors: Sungwook Kim, Seongnam-si (KR); Sangho Choi, Seongnam-si (KR); Byung-Sun Park, Seongnam-si (KR); Junghwan Jin, Seongnam-si (KR); Wonhyo Yi, Seongnam-si (KR); Hyeongbae Shin, Seongnam-si (KR); Seongyeop Jeong, Seongnam-si (KR); Noah Hahm, Seongnam-si (KR); Jimin Kim, Seongnam-si (KR)

(73) Assignee: SNOW CORPORATION, Gyeonggi-Do (KR)

( * ) Notice: Subject to any disclaimer, the term of this patent is extended or adjusted under 35 U.S.C. 154(b) by 131 days.

(21) Appl. No.: 16/549,789

(22) Filed: Aug. 23, 2019

(65) Prior Publication Data

US 2019/0384966 A1 Dec. 19, 2019

Related U.S. Application Data

(63) Continuation of application No. PCT/KR2017/004237, filed on Apr. 20, 2017.

(51) Int. Cl.
*G06K 9/00* (2006.01)
(52) U.S. Cl.
CPC ..... *G06K 9/00275* (2013.01); *G06K 9/00234* (2013.01); *G06K 9/00255* (2013.01); *G06K 9/00281* (2013.01)
(58) Field of Classification Search
CPC .......... G06K 9/00275; G06K 9/00234; G06K 9/00255; G06K 9/00281
See application file for complete search history.

(56) References Cited

U.S. PATENT DOCUMENTS

| 9,646,195 B1 * | 5/2017 | Kim .................. G06K 9/00281 |
| 2004/0085324 A1 | 5/2004 | Yao |

(Continued)

FOREIGN PATENT DOCUMENTS

| JP | 2004-110728 A | 4/2004 |
| JP | 2004-147288 A | 5/2004 |

(Continued)

OTHER PUBLICATIONS

Office Action dated Apr. 1, 2020 in Korean Application No. 10-2019-7009816.

(Continued)

*Primary Examiner* — Kenny A Cese
(74) *Attorney, Agent, or Firm* — Harness, Dickey & Pierce, P.L.C.

(57) ABSTRACT

Provided is a non-transitory computer-readable medium storing instructions for performing image correction by determining a plurality of first facial feature points of a first face included in a first image, displaying (i) at least a portion of the plurality of first facial feature points and (ii) the first image on a screen of an electronic device, recognizing a first input from an external source for moving at least one first facial feature point among the plurality of first facial feature points in the first image displayed on the screen, generating a corrected first image by moving the at least one first facial feature point in response to the first input and correcting the first image based on the moved at least one first facial feature point, and generating correction pattern information by analyzing a correction pattern of the first image.

20 Claims, 10 Drawing Sheets

(56) References Cited

U.S. PATENT DOCUMENTS

| | | | | |
|---|---|---|---|---|
| 2004/0228528 A1* | 11/2004 | Lao | ............... | H04N 1/62 |
| | | | | 382/167 |
| 2008/0240615 A1* | 10/2008 | Yamazaki | ............... | G06T 11/60 |
| | | | | 382/287 |
| 2010/0046841 A1* | 2/2010 | Yamazaki | ............... | G06K 9/00248 |
| | | | | 382/203 |
| 2015/0049111 A1* | 2/2015 | Yamanashi | ............... | A45D 44/005 |
| | | | | 345/632 |

FOREIGN PATENT DOCUMENTS

| | | |
|---|---|---|
| JP | 2006-040228 A | 2/2006 |
| JP | 2011-233073 A | 11/2011 |
| JP | 2017-73108 A | 4/2017 |
| KR | 10-2006-0104027 A | 10/2006 |
| KR | 10-2010-0138140 A | 12/2010 |
| KR | 10-2014-0036687 A | 3/2014 |
| KR | 10-2015-0033877 | 4/2015 |
| WO | WO-2013/077076 A1 | 5/2013 |

OTHER PUBLICATIONS

International Search Report PCT/ISA/210 for International Application No. PCT/KR2017/004237 dated Jan. 12, 2018.

Japanese Office Action dated Sep. 15, 2020 by the Japanese Patent Office corresponding to Japanese patent application No. 2019-550578.

\* cited by examiner

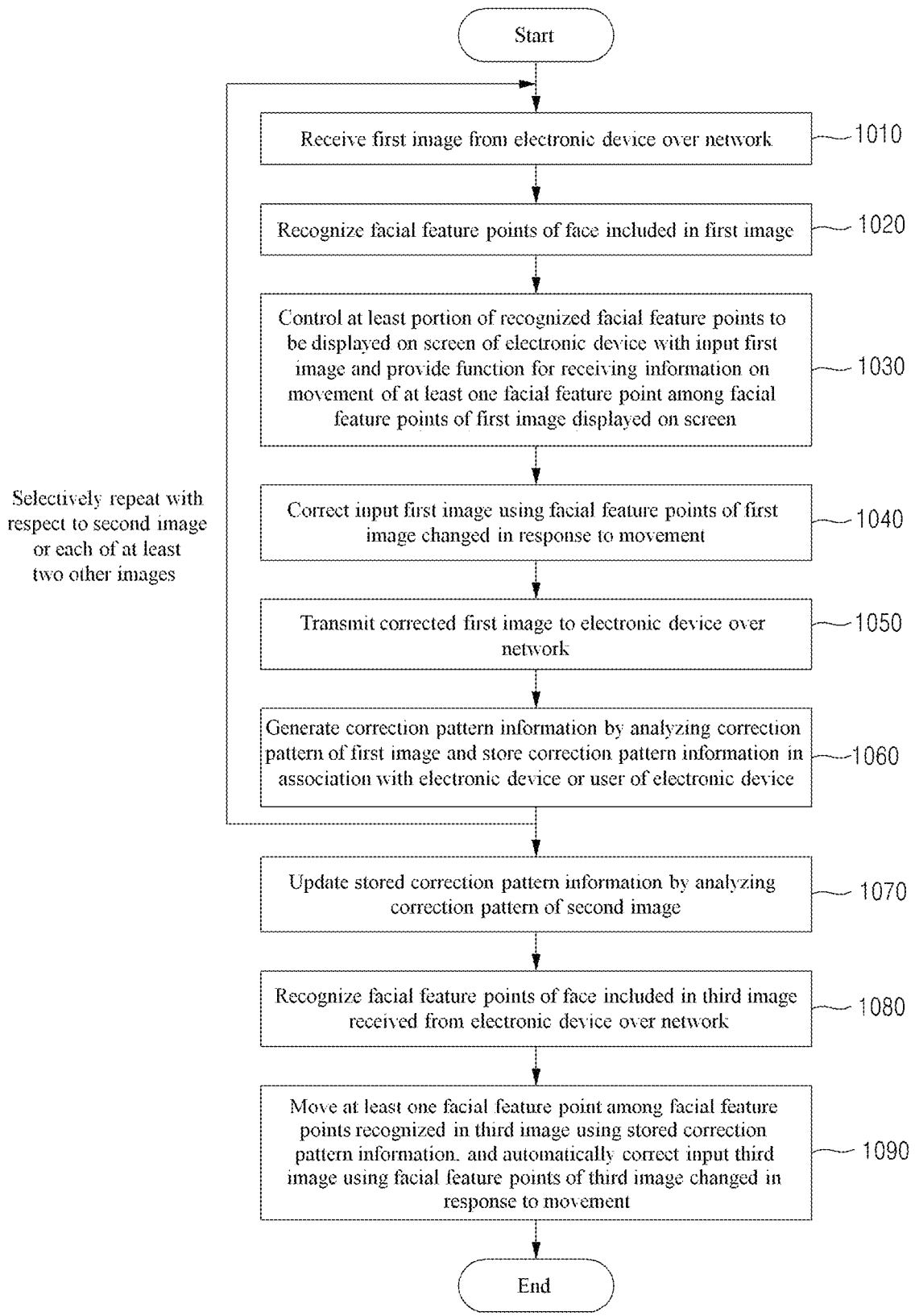

METHOD, SYSTEM, AND COMPUTER-READABLE MEDIA FOR IMAGE CORRECTION VIA FACIAL RATIO

CROSS-REFERENCE TO RELATED APPLICATIONS

This application is a continuation of and claims the benefit under 35 U.S.C. § 365(c) to, International Application No. PCT/KR2017/004237, filed Apr. 20, 2017, the entire contents of which are incorporated herein in its entirety by reference.

BACKGROUND

Some example embodiments relate to image correction methods and/or systems using correction pattern analysis, and/or non-transitory computer-readable recording media storing instructions to implement the image correction methods on a computer in conjunction with the computer.

There are conventional techniques of correcting a face recognized in a facial image. The conventional techniques correct a face of an input image using a filter selected by a user from among pre-generated filters. However, filters according to the conventional techniques as discussed above are not generated using a face of the corresponding user and are generated in advance based on a shape style (e.g., "big eye" and "high nose") desired by the user. Therefore, it is difficult for the user to verify whether the shape style selected by the user is suitable for the face of the user in real time.

For example, the user may generate a filter corresponding to a desired shape style, may apply the filter to an input image, and then may verify a result thereof. Accordingly, if the user does not like a correction result, the user repeats a complex and inconvenient process of re-generating a filter to suit a new shape style and then applying the re-generated filter to the input image.

In addition, since the filters according to the conventional techniques only cause a distortion by variations determined for a specific region of a face (e.g., increases a size of an eye by designated variation for "big eye"), it is difficult to make a correction to suit everybody. For example, a filter "big eye" generated for a user with small eyes is not suitable for a user with big eyes.

That is, in an image correction method according to the conventional techniques, it is difficult to generate a filter suitable for a corresponding user and to share the generated filter with other users.

SUMMARY

Some example embodiments provide image correction methods and/or systems that may provide a function that enables a user to correct an input image by directly moving facial feature points in a state in which the facial feature points recognized in the input image are displayed on a screen with the input image, such that the user may correct an image while monitoring a process in which a face included in the image is being changed in real time, and/or non-transitory computer-readable recording media storing instructions to implement the image correction methods on a computer in conjunction with the computer.

Some example embodiments provide image correction methods and/or systems that may generate correction pattern information in which a ratio of each facial region to the entire face is changed based on a moved facial feature point, instead of simply changing a specific region of the face by determined variation, and may automatically correct the input image based on the correction pattern information, thereby making a correction to suit all of the users, and/or non-transitory computer-readable recording media storing instructions to implement the image correction methods on the computer in conjunction with the computer.

Some example embodiments provide image correction methods and/or systems that may optimize and/or improve the correction pattern information by analyzing a correction pattern of the user with respect to another image of the user and by updating the correction pattern information, and/or non-transitory computer-readable recording media storing instructions to implement the image correction methods on a computer in conjunction with the computer.

According to an aspect of some example embodiments, there is provided an image correction method including determining a plurality of first facial feature points of a first face included in a first image, displaying (i) at least a portion of the plurality of first facial feature points and (ii) the first image on a screen of an electronic device, recognizing a first input from an external source for moving at least one first facial feature point among the plurality of first facial feature points in the first image displayed on the screen, generating a corrected first image by moving the at least one first facial feature point in response to the first input and correcting the first image based on the moved at least one first facial feature point, and generating correction pattern information by analyzing a correction pattern of the first image.

According to an aspect of some example embodiments, there is provided an image correction method including determining a plurality of first facial feature points of a first face included in a first image received from an electronic device over a network, controlling (i) at least a portion of the plurality of first facial feature points and (ii) the first image to be displayed on a screen of the electronic device, receiving information on a first movement of at least one first facial feature point among the plurality of first facial feature points of the first image displayed on the screen, correcting the first image using the at least one first facial feature point in response to the first movement to generate a corrected first image, transmitting the corrected first image to the electronic device over the network, generating correction pattern information by analyzing a correction pattern of the first image, and storing the correction pattern information in association with the electronic device or a user of the electronic device.

According to an aspect of some example embodiments, there is provided a non-transitory computer-readable recording medium storing a computer program, that when executed by processing circuitry, causes the processing circuitry to implement an image correction method.

According to an aspect of some example embodiments, there is provided a computer program stored in a non-transitory computer-readable recording medium to implement the image correction method on a computer in conjunction with the computer.

According to an aspect of some example embodiments, there is provided an image correction system including at least one processor configured to execute a computer-readable instruction. The at least one processor is configured to recognize facial feature points of a face included in a first image input from an electronic device over a network, to control at least a portion of the recognized facial feature points to be displayed on a screen of the electronic device with the input first image and provide a function for receiving information on a movement of at least one facial feature point among the facial feature points of the first image displayed on the screen, to move the at least one facial feature point of the first image in response to the recognized user input and correct the input first image using the facial feature points of the first image changed in response to the movement, to generate correction pattern information by analyzing a correction pattern of the first image and store the correction pattern information in association with the electronic device or a user of the electronic device, and to transmit the corrected first image to the electronic device over the network.

According to some example embodiments, a function may be provided that enables a user to correct an input image by directly moving facial feature points in a state in which the facial feature points recognized in the input image are displayed on a screen with the input image, such that the user may correct an image while monitoring a process in which a face included in the image is being changed in real time.

According to some example embodiments, correction pattern information may be generated in which a ratio of each facial region to the entire face is changed based on a moved facial feature point, instead of simply changing a specific region of the face by determined variation, and to automatically correct the input image based on the correction pattern information, thereby making a correction to suit all of the users.

According to some example embodiments, the correction pattern information may be optimized and/or improved by analyzing a correction pattern of the user with respect to another image of the user and by updating the correction pattern information.

BRIEF DESCRIPTION OF THE DRAWINGS

FIG. 10 is a flowchart illustrating an example of an image correction method performed by a server according to some example embodiments.

DETAILED DESCRIPTION

Hereinafter, some example embodiments will be described with reference to the accompanying drawings.

An image correction system according to some example embodiments may be configured through an electronic device or a server, which is described below, and an image creation method according to some example embodiments may be performed by the image correction system configured through the electronic device or the server. Here, a computer program according to some example embodiments may be installed and executed on the electronic device or the server, and the electronic device or the server may perform the image correction method under control of the executed computer program. The aforementioned computer program may be stored in a non-transitory computer-readable recording medium to perform a story image creation method on a computer in conjunction with the electronic device or the server configured as the computer.

Figure 1:
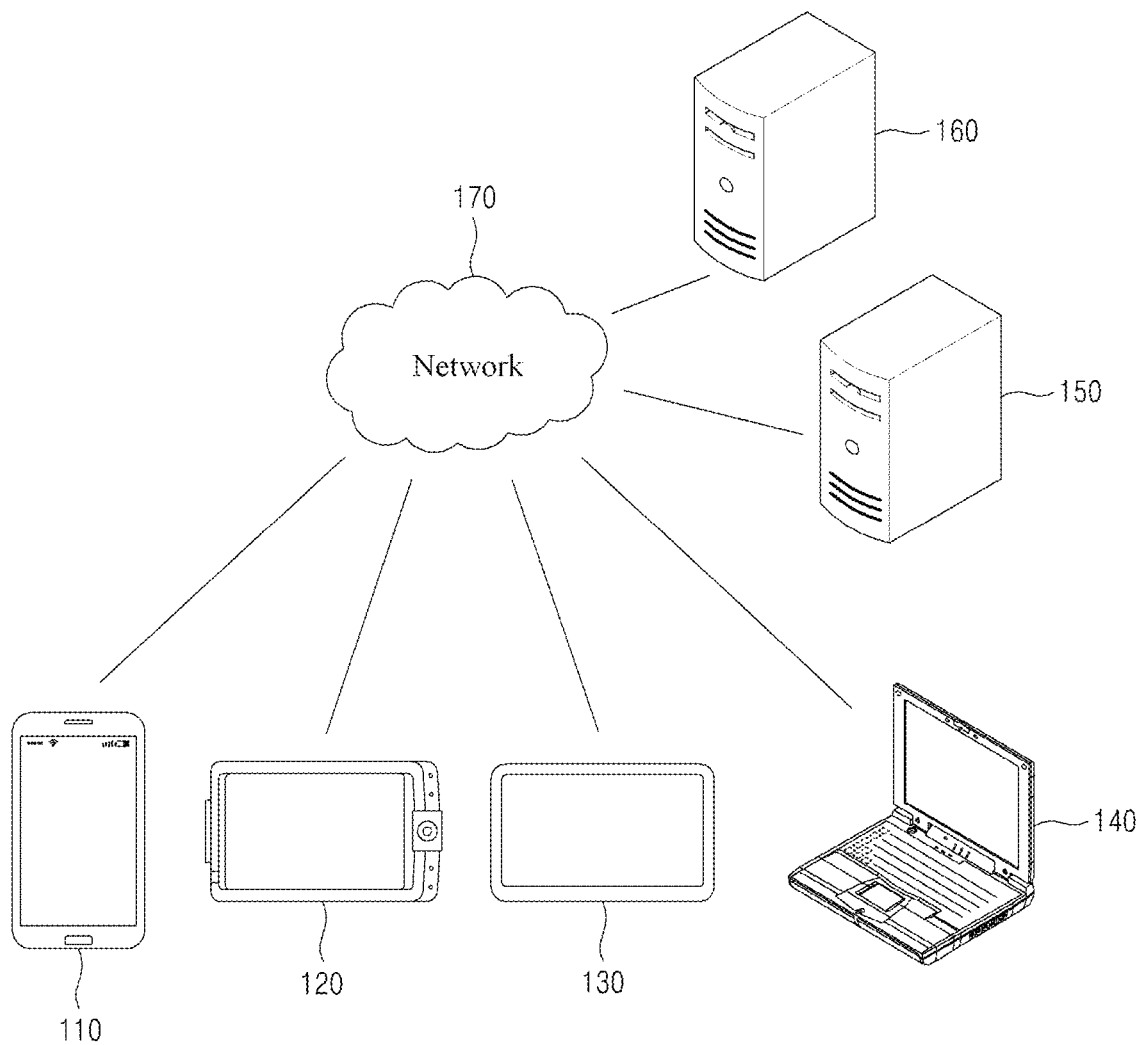
FIG. 1 is a diagram illustrating an example of a network environment according to some example embodiments.

FIG. 1 is a diagram illustrating an example of a network environment according to some example embodiments. Referring to FIG. 1, the network environment includes a plurality of electronic devices 110, 120, 130, and 140, a plurality of servers 150 and 160, and/or a network 170. FIG. 1 is provided as an example only and thus, a number of electronic devices and/or a number of servers are not limited thereto.

Each of the plurality of electronic devices 110, 120, 130, and 140 may be a fixed terminal or a mobile terminal configured as a computer device. For example, the plurality of electronic devices 110, 120, 130, and 140 may be a smartphone, a mobile phone, a navigation device, a computer, a laptop computer, a digital broadcasting terminal, a personal digital assistant (PDA), a portable multimedia player (PMP), and/or a tablet personal computer (PC). For example, although FIG. 1 illustrates a shape of a smartphone as an example of the electronic device 110 (also referred to herein as the electronic device (1) 110), the electronic device (1) 110 may indicate one of various physical devices capable of communicating with other electronic devices 120, 130, and 140, and/or the servers 150 and 160 over the network 170 in a wired communication manner and/or in a wireless communication manner.

The communication scheme is not particularly limited and may include a communication method using a near field communication between devices as well as a communication method using a communication network, for example, a mobile communication network, the wired Internet, the wireless Internet, a broadcasting network, etc., which may be included in the network 170. For example, the network 170 may include at least one of network topologies that include, for example, a personal area network (PAN), a local area network (LAN), a campus area network (CAN), a metropolitan area network (MAN), a wide area network (WAN), a broadband network (BBN), and/or the Internet. Also, the network 170 may include at least one of network topologies that include a bus network, a star network, a ring network, a mesh network, a star-bus network, a tree or hierarchical network, and the like. However, this is only an example and some example embodiments are not limited thereto.

Each of the servers 150 and 160 may be configured as a computer apparatus or a plurality of computer apparatuses that provides instructions, codes, files, contents, services, and the like through communication with the plurality of electronic devices 110, 120, 130, and 140 over the network 170. For example, the server 150 may be a system that provides a first service to the plurality of electronic devices 110, 120, 130, and 140 connected over the network 170, and the server 160 may be a system that provides a second service to the plurality of electronic devices 110, 120, 130, and 140 connected over the network 170. In detail, the server 150 may provide, as the first service, a service (e.g., an image correction service, a messaging service, and a mail service content transmission service) desired by a corresponding application through the application as the computer program installed and executed on the plurality of electronic devices 110, 120, 130, and 140. As another example, the server 160 may provide, as the second service, a service for distributing a file for installing and executing the application to the plurality of electronic devices 110, 120, 130, and 140.

Figure 2:
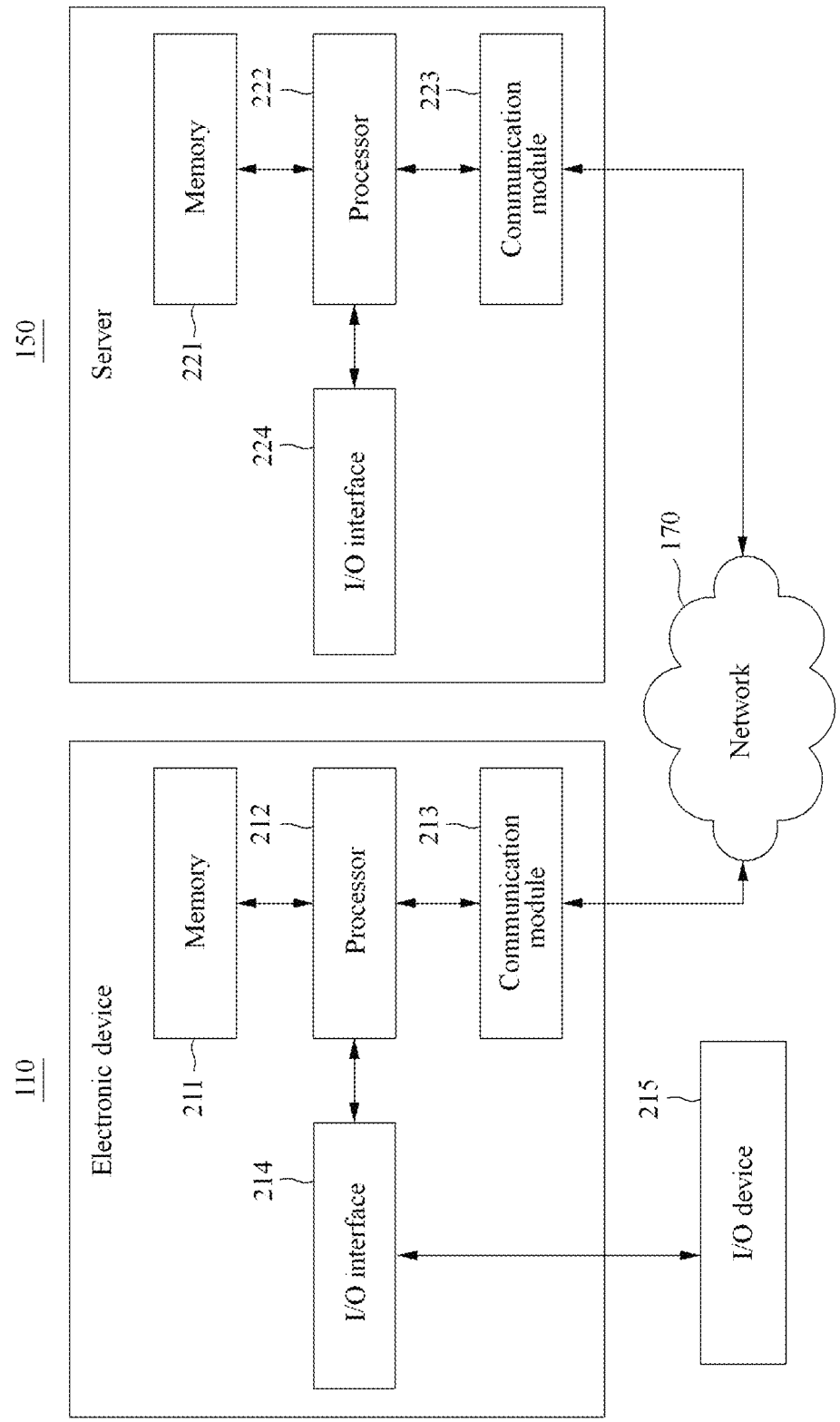
FIG. 2 is a block diagram illustrating a configuration of an electronic device and a server according to some example embodiments.

FIG. 2 is a block diagram illustrating an example of an electronic device and a server according to some example embodiments. FIG. 2 illustrates a configuration of the electronic device (1) 110 as an example for a single electronic device and illustrates a configuration of the server 150 as an example for a single server. Also, other electronic devices 120, 130, and 140, or the server 160 may have the same or similar internal configuration to that of the electronic device (1) 110 or the server 150.

Referring to FIG. 2, the electronic device (1) 110 may include a memory 211, a processor 212, a communication module 213, and an input/output (I/O) interface 214, and the server 150 may include a memory 221, a processor 222, a communication module 223, and an I/O interface 224. Here, the permanent mass storage device such as read only memory (ROM) and disk drive may be included in the electronic device (1) 110 or the server 150 as a permanent storage device separate from the memory 211, 221. Also, an OS or at least one program code, for example, a code for browser installed and executed on the electronic device (1)110 or an application installed on the electronic device (1) 110 to provide a specific service, may be stored in the memory 211, 221. Such software components may be loaded from another non-transitory computer-readable recording medium separate from the memory 211, 221. The other non-transitory computer-readable recording medium may include a non-transitory computer-readable recording medium, for example, a floppy drive, a disk, a tape, a DVD/CD-ROM drive, a memory card, etc. According to some example embodiments, software components may be loaded to the memory 211, 221 through the communication module 213, 223, instead of, or in addition to, the non-transitory computer-readable recording medium. For example, at least one program may be loaded to the memory 211, 221 based on a computer program, for example, the application, installed by files provided over the network 170 from developers or a file distribution system, for example, the server 160, which provides an installation file of the application.

The processor 212, 222 may be configured to process instructions of a computer program by performing basic arithmetic operations, logic operations, and I/O operations. The instructions may be provided from the memory 211, 221 or the communication module 213, 223 to the processor 212, 222. For example, the processor 212, 222 may be configured to execute received instructions in response to the program code stored in the storage device, such as the memory 211, 221.

The communication module 213, 223 may provide a function for communication between the electronic device (1) 110 and the server 150 over the network 170, and may provide a function for communication between the electronic device (1) 110 and/or the server 150 and another electronic device, for example, the electronic device (2) 120 or another server, for example, the server 160. For example, the processor 212 of the electronic device (1) 110 may transfer a request created based on a program code stored in the storage device such as the memory 211, to the server 150 over the network 170 under control of the communication module 213. Inversely, a control signal, an instruction, content, a file, etc., provided under control of the processor 222 of the server 150 may be received at the electronic device (1) 110 through the communication module 213 of the electronic device (1) 110 by going through the communication module 223 and the network 170. For example, a control signal, an instruction, content, a file, etc., of the server 150 received through the communication module 213 may be transferred to the processor 212 or the memory 211, and content, a file, etc., may be stored in a storage medium, for example, the aforementioned permanent storage device, further includable in the electronic device (1) 110.

The I/O interface 214 may be a device used for interface with an I/O device 215. For example, an input device may include a device, such as a keyboard and a mouse, and an output device may include a device, such as a display and a speaker. As another example, the I/O interface 214 may be a device for interface with an apparatus in which an input function and an output function are integrated into a single function, such as a touchscreen. The I/O device 215 may be configured as a single device with the electronic device (1) 110. Also, the I/O interface 224 of the server 150 may be a device for interface with a device (not shown) for an input or an output connectable to the server 150 or includable in the server 150. In detail, when processing instructions of the computer program loaded to the memory 211, the processor 212 of the electronic device (1) 110 may display a service screen configured using data provided from the server 150 or the electronic device (2) 120, or may display content on a display through the I/O interface 214.

According to some example embodiments, the electronic device (1) 110 and the server 150 may include a greater number of components than a number of components shown in FIG. 2. For example, the electronic device (1) 110 may include at least a portion of the I/O device 215, or may further include other components, for example, a transceiver, a global positioning system (GPS) module, a camera, a variety of sensors, a database (DB), and the like. In detail, if the electronic device (1) 110 is a smartphone, the electronic device (1) 110 may be configured to further include a variety of components, for example, an accelerometer sensor, a gyro sensor, a camera module, various physical buttons, a button using a touch panel, an I/O port, a vibrator for vibration, etc., which are generally included in the smartphone.

Figure 3:
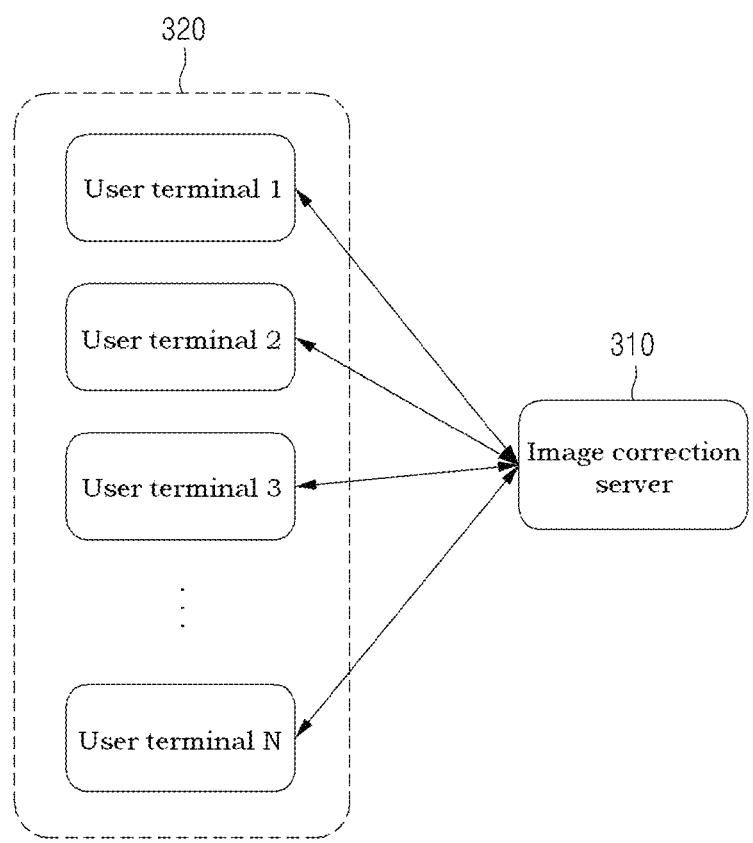
FIG. 3 illustrates an example of an image correction environment according to some example embodiments.

FIG. 3 illustrates an example of an image correction environment according to some example embodiments. An example in which an image correction server 310 provides an image correction service to N user terminals 320 is described with reference to FIG. 3. For example, in response to a request from a specific user terminal, for example, a user terminal 1, among the N user terminals 320, the image correction server 310 may receive an image from the specific user terminal over the network 170, may correct the received image, and may provide the corrected image to the specific user terminal. Depending on some example embodiments, the specific user terminal may designate an image stored on a web (e.g., a website and/or Internet address, such as a Uniform Resource Locator) and the image correction server 310 may correct the designated image and may provide the corrected image to the corresponding user terminal. Here, the image correction server 310 may correspond to the aforementioned server 150 and the specific user terminal may correspond to one of the plurality of electronic devices 110, 120, 130, and/or 140.

Figure 4:
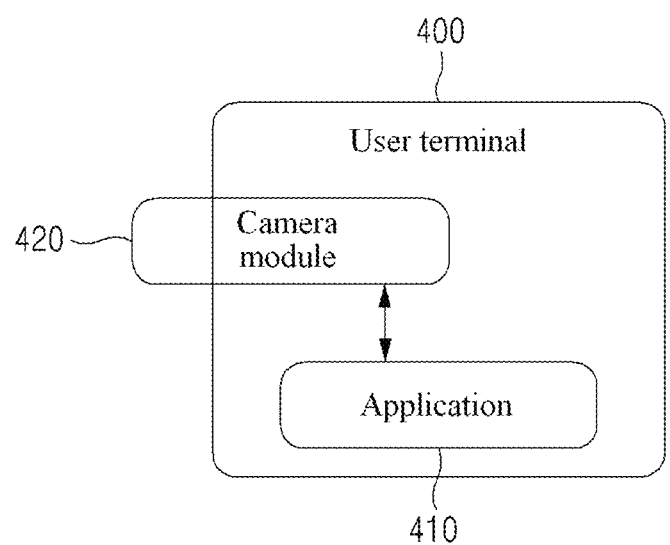
FIG. 4 illustrates another example of an image correction environment according to some example embodiments.

In some example embodiments, an application linked with the image correction service may be installed and executed on the specific user terminal and the specific user terminal may receive the image correction service through communication with the image correction server 310 under control of the application. For example, the specific user terminal may transmit, to the image correction server 310, an image selected through the application from among images stored in a storage of the specific user terminal. As another example, the specific user terminal may transmit, to the image correction server 310, an image input through a camera included in the specific user terminal. Here, based on an image correction method according to some example embodiments, the image correction server 310 may correct the received image and may provide the corrected image to the specific user terminal FIG. 4 illustrates another example of an image correction environment according to some example embodiments. An example in which an application 410 installed and executed on a user terminal 400 directly provides an image correction service is described with reference to FIG. 4. For example, the user terminal 400 may correct an image input through a camera module 420 under control of the application 410. Alternatively, an image stored in a storage of the user terminal 400 may be corrected under control of the application 410. Here, the camera module 420 may be embedded in the user terminal 400, or may be provided as a separate device to communicate with the user terminal 400 over a wired and/or wireless network.

Here, the user terminal 400 may recognize facial feature points of a face included in an input image, and may display the recognized facial feature points on a screen of the user terminal 400 with the input image.

Also, referring to FIG. 3, the image correction server 310 may recognize facial feature points of a face included in an input image, and may control the recognized facial feature points to be displayed on a screen of the specific user terminal described with FIG. 3 with the input image. Here, controlling the recognized facial feature points and the input image to be displayed on a specific user screen may be carried out through communication with an application installed on the specific user terminal.

Figure 5:
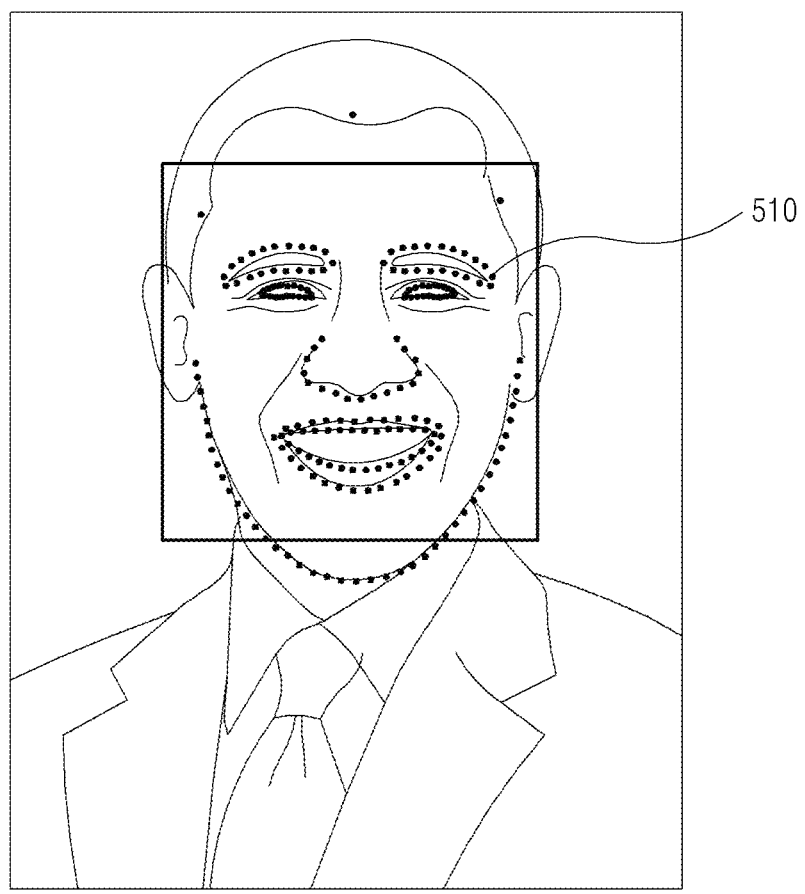
FIG. 5 illustrates an example of recognizing facial feature points of a face included in an image according to some example embodiments.

FIG. 5 illustrates an example of recognizing facial feature points of a face included in an image according to some example embodiments. An example of displaying facial feature points recognized from a face included in an image with the image is described with reference to FIG. 5. Here, a function capable of moving such facial feature points may be provided to a user. For example, as illustrated in FIG. 4, the application installed on the user terminal 400 may provide a function (e.g., a user interface and/or software for implementing the same) capable of moving facial feature points in response to an input of the user. For example, the user may move a first facial feature point 510 to a desired location using the aforementioned function. In detail, in a touchscreen environment, the application may recognize a facial feature point corresponding to a location at which a touch of the user occurs, and may recognize a location at which the user drags and releases the touch with touching the touchscreen as a location to which the recognized facial feature point is to be moved. As another example, in an environment using a mouse, the application may recognize a facial feature point corresponding to a location at which the user clicks on the mouse, and may recognize a location at which the user drags the mouse in a clicked state and releases the clicked mouse as a location to which the recognized facial feature point is to be moved.

In this case, the application may move the recognized facial feature point to the recognized location and may correct the image using facial feature points changed in response to movement of the facial feature point. The movement of the facial feature point may be performed repeated several times and the image may be repeatedly corrected using facial feature points changed every time the facial feature point is moved. Accordingly, the user may acquire a desired image by repeatedly correcting the image while monitoring the image being corrected in real time.

Referring to FIG. 3, information (e.g., an identifier of a corresponding facial feature point) on a facial feature point recognized in response to the input of the user, and information on a location to which the recognized facial feature point is to be moved, may be recognized by the specific user terminal and may be forwarded to the image correction server 310 over a network. Here, the image correction server 310 may correct the image using the changed facial feature points and may provide the corrected image to the specific user terminal. Even in this case, the corrected image may be displayed on a screen of the specific user terminal with the changed facial feature points. Accordingly, the user may correct the image by repeatedly moving the facial feature points while monitoring the image being changed.

The user terminal 400 or the image correction server 310 may generate and/or store correction pattern information by analyzing a correction pattern of the image. For example, the correction pattern information may be generated after the correction of the image is completed. The correction pattern information may be generated to include ratio information of each of a plurality of facial regions to an entire face.

Also, according to some example embodiments, it is possible to automatically correct another image using such correction pattern information.

Figure 6:
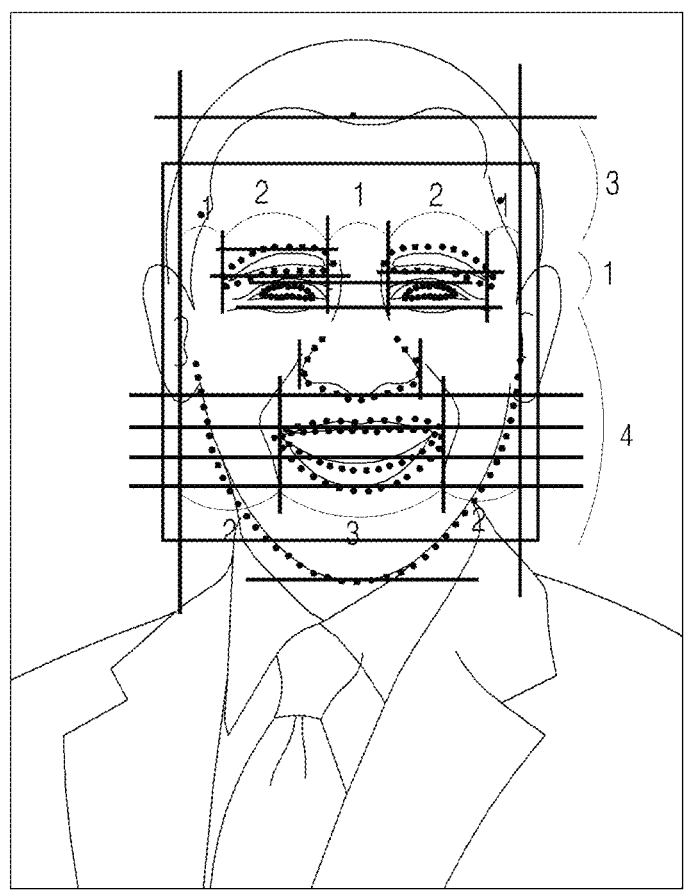
FIG. 6 illustrates an example of ratio information of each of facial regions to the entire face according to some example embodiments.

FIG. 6 illustrates an example of ratio information of each of a plurality of facial regions to an entire face according to some example embodiments. The ratio information may provide information used to change a ratio of the entire face instead of a filter of simply increasing a specific region by a specific value. For example, in the conventional techniques, a filter for increasing an eye width to the left by 0.1 cm increases all of an in-image eye with an eye width of 3 cm and an in-image eye with an eye width of 4 cm to the left by 0.1 cm. Accordingly, an awkward correction may be performed depending on a size of an eye included in an image. On the contrary, according to some example embodiments, a ratio of each region to the entire face may be adjusted based on correction pattern information, instead of simply adjusting a size of a specific region. Accordingly, a value may vary for each actual facial region with respect to each face included in an image and a filter generally available to all of the users may be generated.

In detail, FIG. 6 illustrates an example in which, when a width of the entire face is '7', a ratio of a region (hereinafter, a first region) between an end of a right side of the face and a right eyebrow, the right eyebrow (hereinafter, a second region), a forehead (hereinafter, a third region), a left eyebrow (hereinafter, a fourth region), and a region (hereinafter, a fifth region) between the left eyebrow and an end of a left side of the face is 1:2:1:2:1. If the ratio of the first region to the fifth region in another image is 1:2:1:2:1, corresponding regions in the other image may not be corrected. If the ratio of the first region to the fifth region in still another image is 0.8:2.1:1.2:2.1:0.8, the still other image may be corrected such that the ratio may be the ratio of 1:2:1:2:1 based on correction pattern information. That is, considering a ratio of 7:2 in which the width of the entire face is '7' and a width of the left eyebrow is '2', the width of the left eyebrow may be corrected such that a ratio of the width of the left eyebrow in the other image to the width of the entire face may become 7:2.

In detail, a specific region may be changed not by a fixed variation but by ratio information of a corresponding region to the entire face included in the correction pattern information. Therefore, the correction pattern information may be universally available to all of the users and a correction suitable for each of individual users may be performed. Accordingly, correction pattern information generated during a process in which a specific user corrects an image to suite a face of the specific user may be applied to facial images of other users, which may lead to enhancing the usability according to sharing of the correction pattern information.

Also, correction pattern information may be repeatedly used to perform image correction on another facial image input in relation to the user (e.g., the same user or a different user). For example, facial correction may be processed with respect to an entire video by performing automatic correction on each of frames included in the video in which a face of the user is captured, based on the correction pattern information. As another example, images corrected during a video call may be forwarded to a counterpart of the video call by (e.g., after) performing automatic correction on each of frames of a facial image of the user input through a camera during a video call, based on the correction pattern information.

In the meantime, the correction pattern information may be updated by additionally applying a correction pattern to another image of the user. For example, a correction pattern of another image may be additionally applied to correction pattern information that is generated in advance and stored in response to a request of the user and may be used to update the correction pattern information. In this case, an average value of ratios being changed may be used. For example, when an initial ratio of the width of the left eyebrow to the width of the entire face is 7:2 and a ratio of the left eyebrow to the width of the entire face calculated in a subsequent image is 7:1.8, the ratio of 7:2 included in the correction pattern information may be updated to be 7:1.9. Here, 1.9 may be calculated according to (2+1.8)/2. According to some example embodiments, if a ratio of the left eyebrow to the width of the entire face calculated in a subsequent image is 10:2.4, the ratio of 7:2 included in the correction pattern information may be updated to be 70:18.4 (=7:1.84). Here, 18.4 may be calculated according to ((2*10)+(2.4*7))/2. A correction pattern of the other image may be used to generate another piece of correction pattern information depending on some example embodiments.

The following Table 1 shows an example of a database table that stores correction pattern information.

TABLE 1

| Object | Property | Ratio | Marker |
|---|---|---|---|
| Nose | Width | 2.5 | M2, M3, M4, M5, M6 |
| | Length | 4 | M2, M3, M4, M5, M6 |
| Left Eye | Width | 0.8 | M9, M10, M11, M12, M13, M14, M15 |
| | Length | 1 | M9, M10, M11, M12, M13, M14, M15 |
| Right Eye | Width | 0.8 | M18, M19, M20, M21, M22, M23, M24 |
| | Length | 1 | M18, M19, M20, M21, M22, M23, M24 |
| Jaw | Width | 5 | M92, M93, M95 |
| | Length | 3 | M92, M93, M95 |

TABLE 1-continued

| Object | Property | Ratio | Marker |
|---|---|---|---|
| Forehead | ... | ... | ... |
| ... | ... | ... | ... |

Referring to Table 1, an item 'Object' may be an item denoting a facial region and a value thereof may identify the facial region, and an item 'Property' denotes a reference used to measure a ratio, such as a width and a length of the facial region. Also, an item 'Ratio' denotes ratio information of a corresponding facial region to the entire face and an item 'Marker' denotes facial feature points. Here, each of the facial feature points may correspond to corresponding location information in a corresponding facial image. Each of a width and a length of the entire face may be included in Table 1 as a separate item 'Object' and may be calculated through combination of facial regions according to some example embodiments.

Figure 7:
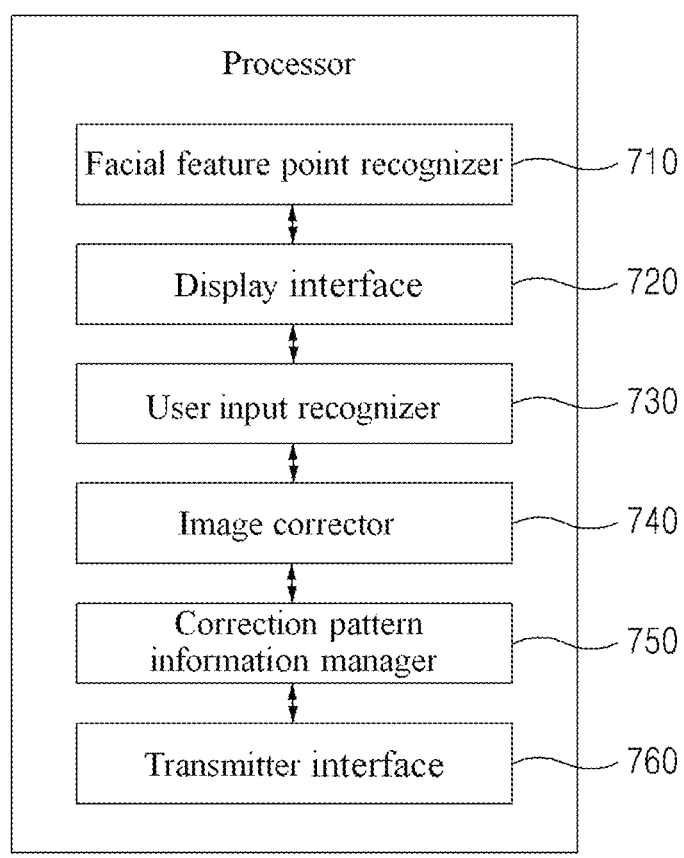
FIG. 7 is a block diagram illustrating an example of components includable in a processor of an electronic device according to some example embodiments.
Figure 8:
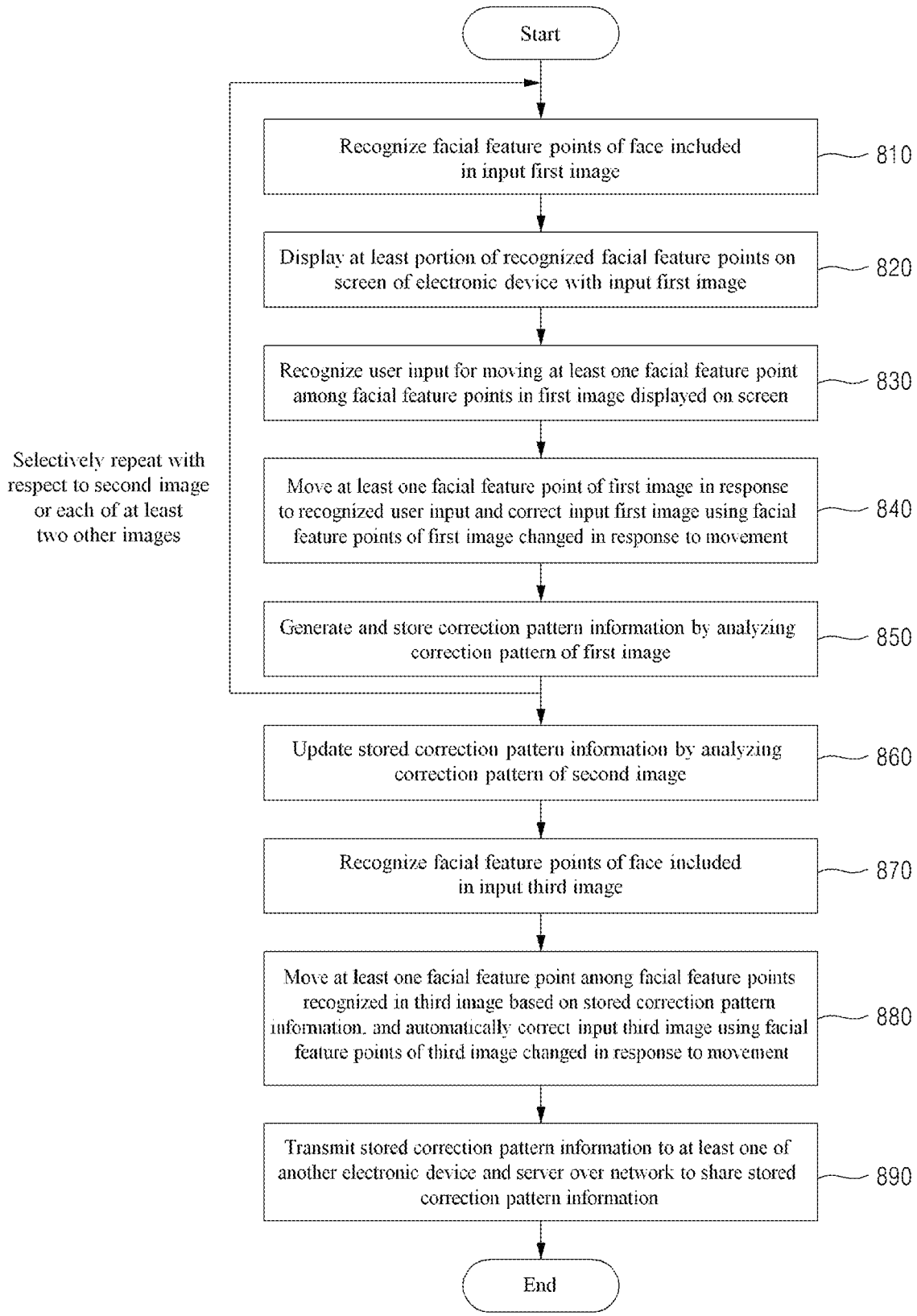
FIG. 8 is a flowchart illustrating an example of an image correction method performed by an electronic device according to some example embodiments.

FIG. 7 is a block diagram illustrating an example of components includable in a processor of an electronic device according to some example embodiments, and FIG. 8 is a flowchart illustrating an example of an image correction method performed by an electronic device according to some example embodiments.

An image correction system according to some example embodiments may be configured in a form of a computer apparatus such as the electronic device (1) 110. Also, referring to FIG. 7, the processor 212 of the electronic device (1) 110 (e.g., the processor 212 may include at least one processor) may include a facial feature point recognizer 710, a display interface 720, a user input recognizer 730, an image corrector 740, a correction pattern information manager 750, and/or a transmitter interface 760 as components to configure the image correction system. The processor 212 and the components of the processor 212 may perform operations 810 to 890 included in the image correction method of FIG. 8. Here, the processor 212 and the components of the processor 212 may be configured to execute a control instruction according to a code of at least one program and/or a code of an OS included in the memory 211. Here, the components of the processor 212 may be representations of different functions of the processor 212 performed by the processor 212 in response to the control instruction provided from a code stored on the electronic device (1) 110. For example, the facial feature point recognizer 710 may be used as a functional representation of the processor 212 that controls the electronic device (1) 110 to recognize a facial feature point in response to the control instruction. According to some example embodiments, operations described herein as being performed by any or all of the electronic device 110, the processor 212, the server 150, the processor 222, the user terminals 1-N 320, the image correction server 310, the user terminal 400, the application 410, the camera module 420, the facial feature point recognizer 710, the display interface 720, the user input recognizer 730, the image corrector 740, the correction pattern information manager 750, and/or the transmitter interface 760 may be performed by processing circuitry. The term 'processing circuitry,' as used in the present disclosure, may refer to, for example, hardware including logic circuits; a hardware/software combination such as a processor executing software (e.g., the processor 212 and/or the processor 222); or a combination thereof. For example, the processing circuitry more specifically may include, but is not limited to, a central processing unit (CPU), an arithmetic logic unit (ALU), a digital signal processor, a microcomputer, a field programmable gate array (FPGA), a System-on-Chip (SoC), a programmable logic unit, a microprocessor, application-specific integrated circuit (ASIC), etc.

Referring to FIG. 8, in operation 810, the facial feature point recognizer 710 may recognize (e.g., determine) facial feature points (e.g., a plurality of facial feature points) of a face included in an input first image. Detailed techniques for recognizing facial feature points in a facial image may be easily understood by those skilled in the art through known arts. An input image may be an image that is included in the electronic device (1) 110, an image that is input through a camera interacting with the electronic device (1) 110, and/or an image that is stored in a local storage of the electronic device (1) 110. Alternatively or additionally, the input image may be an image that is received by the electronic device (1) 110 from another device over the network 170 and/or an image that is stored on a web (e.g., a website and/or Internet address).

In operation 820, the display interface 720 may display at least a portion of the recognized facial feature points on a screen of the electronic device (1) 110 with the input first image. For example, as described above with FIG. 5, both the image and the facial feature points may be displayed on a single screen. Here, the screen of the electronic device (1) 110 may indicate a screen of a display device, for example, a touchscreen, included in the electronic device (1) 110, and/or may indicate a screen of a display device, for example, a monitor, communicating with the electronic device (1) 110 as a device separate from the electronic device (1) 110.

In operation 830, the user input recognizer 730 may recognize a user input (e.g., an input from an external source) for moving at least one facial feature point among the facial feature points in the first image displayed on the screen. An example of moving a facial feature point in response to a user input in a touchscreen environment or an environment using a mouse is described above. That a user input for moving a facial feature point in another input environment is recognizable may be easily understood by those skilled in the art from the aforementioned examples.

In operation 840, the image corrector 740 may move the at least one facial feature point of the first image in response to the recognized user input and may correct the input first image using the facial feature points of the first image changed in response to the movement (e.g., the image corrector 740 may generate a corrected first image by moving the at least one facial feature point in response to the user input). Some example embodiments relate to a method used to move a facial feature point, and correcting a face of an image (e.g., a representation of a face included in an image) based on a location of the moved facial feature point may be easily understood by those skilled in the art from the conventional techniques. For example, a technique of using a prepared filter refers to a technique of moving a marker by set variation and correcting a facial image based on the moved marker. Such a correction related technique is well known. The corrected first image and/or changed facial feature points may be displayed on the screen. A process (operations 820 to 840) of moving the facial feature point and correcting the first image according to the movement may be performed repeatedly several times.

In operation 850, the correction pattern information manager 750 may generate and/or store correction pattern information by analyzing a correction pattern of the first image. Although the correction pattern information may be generated using various methods, according to some example embodiments, the correction pattern information may be generated using ratio information of each of the facial regions to the entire face, as described above. For example, the correction pattern information manager 750 may recognize (e.g., determine) facial regions (e.g., a plurality of facial regions) in the face of the first image using the facial feature points of the first image changed (e.g., the corrected first image) in response to the movement (e.g., the movement by the image corrector 740), and may calculate ratio information of each of the facial regions to (e.g., with respect to) the entire face as the correction pattern information. In detail, the correction pattern information may include information in which a region identifier of each of the facial regions, ratio information associated with a width and/or a length of each of the facial regions to a width and/or a length of the entire face, and/or feature point identifiers of facial feature points corresponding to each of the facial regions are interrelated. The correction pattern information generated in this manner may be stored as a database such as in Table 1.

According to some example embodiments, the correction pattern information may be generated to include facial feature points of the first image changed in response to the movement. According to some example embodiments, the correction pattern information may be generated to include all of facial feature points of the first image before being changed and facial feature points of the first image after being changed. For example, only the facial feature points of the first image changed in response to the movement may be initially stored and then the aforementioned ratio information may be selectively calculated and used. Alternatively, automatic correction of another image may be processed using only information on the changed facial feature points.

Such operations 810 to 850 may be selectively repeated with respect to a second image or each of at least two other images. That is, a process of recognizing, moving, correcting facial feature points and generating correction pattern information may be repeated with respect to the second image or each of at least two other images.

In operation 860, the correction pattern information manager 750 may update the stored correction pattern information by analyzing a correction pattern of the second image. For example, the correction pattern information stored for the first image may be updated using the correction pattern information generated for the second image. An example of updating the correction pattern information using the average correction ratio is described above. Also, a weight according to a point in time at which correction pattern information is generated or a weight set by the user may be further used to update the correction pattern information and a value of a certain decimal point may be rounded or discarded in the course of a calculation, which may be easily understood by those skilled in the art from the aforementioned examples. Also, when operations 810 to 850 are repeatedly performed with respect to each of the at least two other images, the stored correction pattern information may be updated using the correction pattern information generated for each of the at least two other images. Operation 860 may be selectively performed when operations 810 to 850 are repeatedly performed with respect to other images including the second image.

In operation 870, the facial feature point recognizer 710 may recognize facial feature points of a face included in an input third image. Operation 870 may correspond to operation 810 and may be performed in the case of processing automatic correction on the third image. For example, when an instruction associated with the automatic correction is explicitly received from the user or when a set condition that specifies the automatic correction is met, a process of recognizing a facial feature point for the automatic correction may be performed.

In operation 880, the image corrector 740 may move at least one facial feature point among the facial feature points recognized in the third image based on the stored correction pattern information, and may automatically correct the input third image using the facial feature points of the third image changed in response to the movement. For example, the image corrector 740 may automatically correct the third image such that ratio information of each of a plurality of facial regions to the entire face included in the third image may become (e.g., may conform to) ratio information included in the stored correction pattern information.

In operation 890, the transmitter interface 760 may transmit the stored correction pattern information to at least one of another electronic device and a server over a network to share the stored correction pattern information. Operation 890 may be performed at any time after initially generating and/or storing the correction pattern information through operation 850.

According to some example embodiments, the user may directly move facial feature points while monitoring an image to be corrected and the facial feature points, and may also correct the image in a desired manner while monitoring an image correction process according to the movement of the facial feature points. Also, it is possible to automatically correct another image based on correction pattern information associated with the above correction and to update the stored correction pattern information using correction pattern information generated for the other image. In addition, it is possible to achieve the general-purpose property of correction pattern information by generating the correction pattern information based on ratio information of each of the facial regions to the entire face and by correcting a facial image based on the ratio information.

Some example embodiments in which the electronic device 110 provides an image correction service under control of an application are described with reference to FIGS. 7 and 8. However, as described above, the image correction service may be provided through the image correction server 310.

Figure 9:
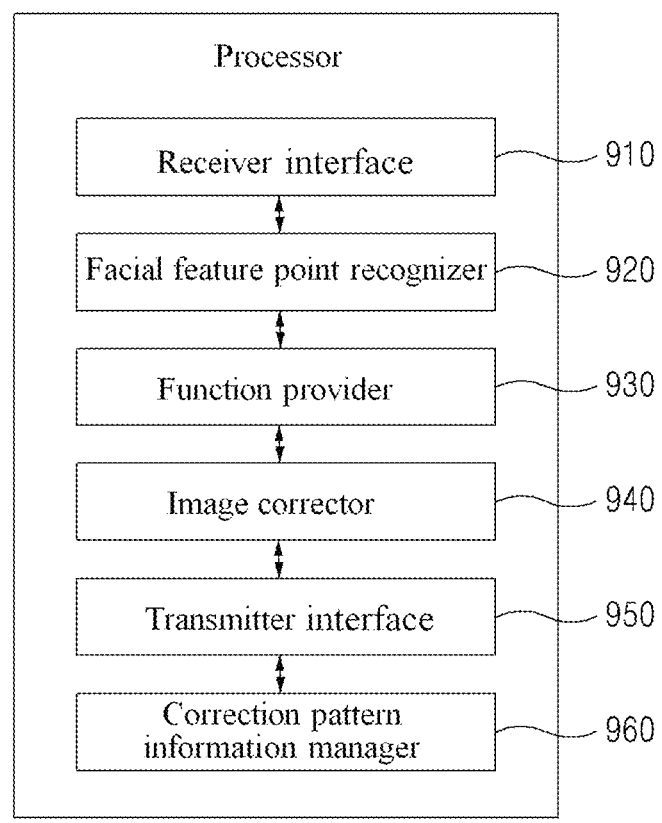
FIG. 9 is a block diagram illustrating an example of components includable in a processor of a server according to some example embodiments.

FIG. 9 is a block diagram illustrating an example of components includable in a processor of a server according to some example embodiments, and FIG. 10 is a flowchart illustrating an example of an image correction method performed by a server according to some example embodiments.

An image correction system according to some example embodiments may be configured in a form of a computer apparatus such as the server 150. Also, referring to FIG. 9, the processor 222 of the server 150 (e.g., the processor 222 may include at least one processor) may include a receiver interface 910, a facial feature point recognizer 920, a function provider 930, an image corrector 940, a transmitter interface 950, and/or a correction pattern information manager 960 as components to configure the image correction system. The processor 222 and the components of the processor 222 may perform operations 1010 to 1090 included in the image correction method of FIG. 10. Here, the processor 222 and the components of the processor 222 may be configured to execute a control instruction according to a code of at least one program and/or a code of an OS included in the memory 221. Here, the components of the processor 222 may be representations of different functions of the processor 222 performed by the processor 222 in response to a control instruction provided from a code stored on the server 150. For example, the receiver interface 910 may be used as a functional representation of the processor 222 that controls the server 150 to receive an image in response to the control instruction. According to some example embodiments, operations described herein as being performed by any or all of the receiver interface 910, the facial feature point recognizer 920, the function provider 930, the image corrector 940, the transmitter interface 950, and/or the correction pattern information manager 960 may be performed by processing circuitry.

Referring to FIG. 10, in operation 1010, the receiver interface 910 may receive a first image from an electronic device over a network. The electronic device may be a device on which an application associated with an image correction service is installed and executed, and may transmit the first image to be corrected to the server 150 by communicating with the server 150 through the application. The first image may be an image that is included in the electronic device, an image that is input through a camera interacting with the electronic device, and/or an image that is stored in a local storage of the electronic device. Alternatively or additionally, the first image may be an image that is received by the electronic device from another device over the network 170 and/or an image that is stored on a web (e.g., a website and/or an Internet address).

In operation 1020, the facial feature point recognizer 920 may recognize (e.g., determine) facial feature points (e.g., a plurality of facial feature points) of a face included in the first image. As described above, detailed techniques for recognizing facial feature points in a facial image may be easily understood by those skilled in the art.

In operation 1030, the function provider 930 may control (e.g., cause) at least a portion of the recognized facial feature points to be displayed on a screen of the electronic device with the input first image and may provide a function for receiving information on a movement of at least one facial feature point among the facial feature points of the first image displayed on the screen. The function may be performed through interaction with the application installed and executed on the electronic device. As described above, information on an identifier of the moved facial feature point(s) and the moved location(s) may be recognized (e.g., determined) at and transmitted from the electronic device to the server 150 under control of the application of the electronic device.

In operation 1040, the image corrector 940 may correct the input first image (e.g., generate a corrected first image) using the facial feature points of the first image changed in response to the movement. Some example embodiments relate to a method used to move a facial feature point, and correcting a face of an image (e.g., a representation of a face included in an image) based on a location of the moved facial feature point may be easily understood by those skilled in the art through known techniques. For example, a technique of using a prepared filter refers to a technique of moving a marker by set variation and correcting a facial image based on the moved marker. Such a correction related technique is well known.

In operation 1050, the transmitter interface 950 may transmit the corrected first image to the electronic device over the network. A process of correcting the second image through operations 1010 to 1050 may be performed repeatedly several times.

In operation 1060, the correction pattern information manager 960 may generate correction pattern information by analyzing a correction pattern of the first image and may store the correction pattern information in association with the electronic device and/or a user of the electronic device. The correction pattern information is described above and thus, a further description is omitted.

Operations 1010 to 1060 may be selectively repeated with respect to the second image or each of at least two other images. That is, a process of recognizing, moving, and correcting facial feature points of an image, transmitting the corrected image, and generating correction pattern information may be repeated with respect to the second image or each of at least two other images.

In operation 1070, the correction pattern information manager 960 may update the stored correction pattern information by analyzing a correction pattern of the second image. For example, the correction pattern information stored for the first image may be updated using the correction pattern information generated for the second image (e.g., by averaging as discussed above, etc.). Also, when operations 1010 to 1060 are repeatedly performed with respect to each of the at least two images, the stored correction pattern information may be updated using correction pattern information generated for each of the at least two other images. Operation 1070 may be selectively performed when operations 1010 to 1060 are repeatedly performed with respect to other images including the second image.

In operation 1080, the facial feature point recognizer 920 may recognize (e.g., determine) facial feature points (e.g., a plurality of facial feature points) of the face included in a third image received from the electronic device over the network. Operation 1080 may correspond to operations 1010 and 1020 and may be selectively performed in the case of processing automatic correction on the third image. For example, when an instruction associated with the automatic correction is explicitly received from the user or when a set condition that specifies the automatic correction is met, a process of recognizing a facial feature point for the automatic correction may be performed.

In operation 1090, the image corrector 940 may move at least one facial feature point among the facial feature points recognized in the third image using the stored correction pattern information, and may automatically correct the input third image using the facial feature points of the third image changed in response to the movement. The corrected third image may be transmitted to the electronic device over the network.

Also, in some example embodiments, the stored correction pattern information may be shared with other users. For example, in response to a request from the user, the server 150 may transmit the stored correction pattern information to another user recognized through the request. Also, after receiving the stored correction pattern information from the electronic device of the user, the user may directly share the received correction pattern information with other users.

According to some example embodiments, it is possible to provide a function that enables a user to correct an input image by directly moving facial feature points in a state in which the facial feature points recognized in the input image are displayed on a screen with the input image, such that the user may correct an image while monitoring a process in which a face included in the image is being changed in real time. Also, it is possible to generate correction pattern information in which a ratio of each facial region to the entire face is changed based on a moved facial feature point, instead of simply changing a specific region of the face by determined variation, and to correct the input image based on the correction pattern information, thereby making a correction to suit all of the users. Also, it is possible to optimize and/or improve the correction pattern information by analyzing a correction pattern of the user with respect to another image of the user and by updating the correction pattern information.

The systems or apparatuses described herein may be implemented using processing circuitry including hardware components, software components, and/or a combination thereof. For example, the apparatuses and the components described herein may be implemented using one or more general-purpose or special purpose computers, such as, for example, a processor, a controller, an arithmetic logic unit (ALU), a digital signal processor, a microcomputer, a field programmable gate array (FPGA), a programmable logic unit (PLU), a microprocessor, or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will be appreciated that a processing device may include multiple processing elements and/or multiple types of processing elements. For example, a processing device may include multiple processors or a processor and a controller. In addition, different processing configurations are possible, such as parallel processors.

The software may include a computer program, a piece of code, an instruction, or some combination thereof, for independently or collectively instructing or configuring the processing device to operate as desired. Software and/or data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more computer readable recording mediums.

The methods according to some example embodiments may be recorded in non-transitory computer-readable storage media including program instructions to implement various operations. The media may also include, alone or in combination with the program instructions, data files, data structures, and the like. The program instructions recorded on the media may be those specially designed and constructed for the purposes of some example embodiments, or they may be of the kind well-known and available to those having skill in the computer software arts. Examples of non-transitory computer-readable storage media include magnetic media such as hard disks, floppy disks, and magnetic tapes; optical media such as CD-ROM discs, and DVDs; magneto-optical media such as floptical disks; and hardware devices that are specially configured to store and perform program instructions, such as read-only memory (ROM), random access memory (RAM), flash memory, and the like. The media may be various recording devices or storage devices in which a single piece or a plurality of pieces of hardware are combined and may be present on a network without being limited to a medium directly connected to a computer system. Examples of program instructions include both machine code, such as produced by a compiler, and files containing higher level code that may be executed by the computer using an interpreter.

While this disclosure includes some example embodiments, it will be apparent to one of ordinary skill in the art that various alterations and modifications in form and details may be made without departing from the spirit and scope of the claims and their equivalents. For example, suitable results may be achieved if the described techniques are performed in a different order, and/or if components in a described system, architecture, device, or circuit are combined in a different manner, and/or replaced or supplemented by other components or their equivalents.

Therefore, the scope of the disclosure is defined not by the detailed description, but by the claims and their equivalents, and all variations within the scope of the claims and their equivalents are to be construed as being included in the disclosure.

What is claimed is:

1. A non-transitory computer-readable recording medium storing a computer program, that when executed by processing circuitry, causes the processing circuitry to implement an image correction method, comprising:
   determining a plurality of first facial feature points of a first face included in a first image;
   displaying (i) at least a portion of the plurality of first facial feature points and (ii) the first image on a screen of an electronic device;
   recognizing a first input from an external source for moving at least one first facial feature point among the plurality of first facial feature points in the first image displayed on the screen;
   generating a corrected first image by moving the at least one first facial feature point in response to the first input and correcting the first image based on the moved at least one first facial feature point, the corrected first image including a corrected first face; and
   generating correction pattern information by analyzing a correction pattern of the first image, the correction pattern information including a ratio of a first value with respect to a second value, the first value being a height of a first facial region in the corrected first face, and the second value being a height of an entirety of the corrected first face.

2. The non-transitory computer-readable recording medium of claim 1, wherein the image correction method further comprises:
   determining a plurality of second facial feature points of a second face included in a second image;
   displaying (i) at least a portion of the plurality of second facial feature points and (ii) the second image on the screen;
   recognizing a second input from an external source for moving at least one second facial feature point among the plurality of second facial feature points in the second image displayed on the screen;
   generating a corrected second image by moving the at least one second facial feature point in response to the second input and correcting the second image based on the moved at least one second facial feature point; and
   updating the correction pattern information by analyzing a correction pattern of the second image.

3. The non-transitory computer-readable recording medium of claim 1, wherein the image correction method further comprises:
   determining a plurality of third facial feature points of a third face included in a third image; and
   generating a corrected third image by moving at least one third facial feature point among the plurality of third facial feature points based on the correction pattern information and correcting the third image based on the moved at least one third facial feature point.

4. The non-transitory computer-readable recording medium of claim 1, wherein the generating the correction pattern information comprises:
   determining a plurality of facial regions in the corrected first face using the at least one first facial feature point, the plurality of facial regions including the first facial region; and
   calculating the correction pattern information based on ratio information of each of the plurality of facial regions with respect to the entirety of the corrected first face.

5. The non-transitory computer-readable recording medium of claim 4, wherein the correction pattern information comprises interrelations between a region identifier of each of the plurality of facial regions, ratio information associated with a width and a length of each of the plurality of facial regions to a width and a length of the entirety of the corrected first face, and a plurality of feature point identifiers of one or more first facial feature points among the plurality of first facial feature points corresponding to each of the plurality of facial regions.

6. The non-transitory computer-readable recording medium of claim 4, wherein the correction pattern information further comprises the plurality of first facial feature points of the corrected first image changed in response to the moving the at least one first facial feature point.

7. The non-transitory computer-readable recording medium of claim 1, wherein the image correction method further comprises:
   transmitting the correction pattern information to at least one of another electronic device or a server over a network.

8. The non-transitory computer-readable recording medium of claim 2, wherein the first face and the second face are the same face.

9. The non-transitory computer-readable recording medium of claim 3, wherein the first face and the third face are the same face.

10. The non-transitory computer-readable recording medium of claim 1, wherein the first input comprises:
    an identifier of one first facial feature point among at least one first facial feature point; and
    a location to which the one first facial feature point is moved.

11. The non-transitory computer-readable recording medium of claim 1, wherein
    the ratio is a first ratio; and
    the correction pattern information includes a second ratio of a width of the first facial region with respect to a width of the entirety of the corrected first face.

12. An image correction method comprising:
    determining a plurality of first facial feature points of a first face included in a first image;
    displaying (i) at least a portion of the plurality of first facial feature points and (ii) the first image on a screen of an electronic device;
    recognizing a first input from an external source for moving at least one first facial feature point among the plurality of first facial feature points in the first image displayed on the screen;
    generating a corrected first image by moving the at least one first facial feature point in response to the first input and correcting the first image based on the moved at least one first facial feature point, the corrected first image including a corrected first face; and
    generating correction pattern information by analyzing a correction pattern of the first image, the correction pattern information including a ratio of a first value with respect to a second value, the first value being a height of a first facial region in the corrected first face, and the second value being a height of an entirety of the corrected first face.

13. The image correction method of claim 12, further comprising:
   determining a plurality of second facial feature points of a second face included in a second image;
   displaying (i) at least a portion of the plurality of second facial feature points and (ii) the second image on the screen;
   recognizing a second input from an external source for moving at least one second facial feature point among the plurality of second facial feature points in the second image displayed on the screen;
   generating a corrected second image by moving the at least one second facial feature point in response to the second input and correcting the second image based on the moved at least one second facial feature point; and
   updating the correction pattern information by analyzing a correction pattern of the second image.

14. The image correction method of claim 12, further comprising:
   determining a plurality of third facial feature points of a third face included in a third image; and
   generating a corrected third image by moving at least one third facial feature point among the plurality of third facial feature points based on the correction pattern information and correcting the third image based on the moved at least one third facial feature point.

15. An image correction method comprising:
   determining a plurality of first facial feature points of a first face included in a first image received from an electronic device over a network;
   controlling (i) at least a portion of the plurality of first facial feature points and (ii) the first image to be displayed on a screen of the electronic device;
   receiving information on a first movement of at least one first facial feature point among the plurality of first facial feature points of the first image displayed on the screen;
   correcting the first image using the information on the first movement of the at least one first facial feature point to generate a corrected first image, the corrected first image including a corrected first face;
   transmitting the corrected first image to the electronic device over the network;
   generating correction pattern information by analyzing a correction pattern of the first image, the correction pattern information including a ratio of a first value with respect to a second value, the first value being a height of a first facial region in the corrected first face, and the second value being a height of an entirety of the corrected first face; and
   storing the correction pattern information in association with the electronic device or a user of the electronic device.

16. The image correction method of claim 15, further comprising:
   determining a plurality of second facial feature points of a second face included in a second image received from the electronic device over the network;
   controlling (i) at least a portion of the plurality of second facial feature points and (ii) the second image to be displayed on the screen of the electronic device;
   receiving information on a second movement of at least one second facial feature point among the plurality of second facial feature points of the second image displayed on the screen;
   correcting the second image using the information on the second movement of the at least one second facial feature point to generate a corrected second image;
   transmitting the corrected second image to the electronic device over the network; and
   updating the stored correction pattern information by analyzing a correction pattern of the second image.

17. The image correction method of claim 15, further comprising:
   determining a plurality of third facial feature points of a third face included in a third image received from the electronic device over the network;
   generating a corrected third image by moving at least one third facial feature point among the plurality of third facial feature points using the stored correction pattern information and correcting the third image based on the moved at least one third facial feature point; and
   transmitting the corrected third image to the electronic device over the network.

18. The image correction method of claim 15, wherein the generating the correction pattern information comprises:
   determining a plurality of facial regions in the corrected first face using at least one first facial feature point, the plurality of facial regions including the first facial region; and
   calculating the correction pattern information based on ratio information of each of the plurality of facial regions with respect to the entirety of the corrected first face.

19. The image correction method of claim 18, wherein the correction pattern information comprises interrelations between a region identifier of each of the plurality of facial regions, ratio information associated with a width and a length of each of the plurality of facial regions to a width and a length of the entirety of the corrected first face, and a plurality of feature point identifiers of one or more first facial feature points among the plurality of first facial feature points corresponding to each of the plurality of facial regions.

20. The image correction method of claim 18, wherein the correction pattern information further comprises at least one corrected first facial feature point of the corrected first image.

* * * * *